May 6, 1952  E. DALAND  2,595,642
AIRCRAFT ROTOR BLADE PITCH CONTROL LINKAGE
Filed Nov. 29, 1946

INVENTOR
Elliot Daland

Patented May 6, 1952

2,595,642

UNITED STATES PATENT OFFICE 2,595,642

AIRCRAFT ROTOR BLADE PITCH CONTROL LINKAGE

Elliot Daland, Wallingford, Pa., assignor, by mesne assignments, to Piasecki Helicopter Corporation, Morton, Pa., a corporation of Pennsylvania Application November 29, 1946, Serial No. 713,038

3 Claims. (Cl. 170—160.25)

This invention relates to improvements in rotary wing aircraft employing rotors provided with flapping hinges and more particularly to means for improving the control of the same.

In using rotors of this style, it has been common practice to allow the blades to flap individually and cone without restraint. To apply a rolling moment to an aircraft of this type it is necessary to give a large amount of cyclic pitch change to the blades in order to tilt the lift vector sufficiently to obtain the desired rolling moment. Slow movement of the cyclic control of a helicopter not provided with this invention produces a horizontal translation of the craft before the angular position of the craft is changed. This is not desirable as it produces a lag in the control and does not allow the pilot to apply a full rolling moment to the craft. This is particularly true of heavy machines and machines wherein the rotor hub is close to the center of gravity of the machine. However, unrestrained coning is desirable as it smooths out "air bumps" and allows the rotor to assume different coning angles resulting from varying loading conditions without putting undue bending forces on the blades.

The principal object of this invention is to provide greater control of rotary wing aircraft.

Another object of this invention is to provide means to restrain flapping of rotor blades and to allow unrestrained coning of said blades.

A further object of this invention is to provide a flapping restrainer which will permit the blade to flap upward should undue loads be placed on the blade so as to relieve the blade of high bending forces.

Other objects and advantages will become apparent when the following specification is read in conjunction with the accompanying drawings.

Figure 1:
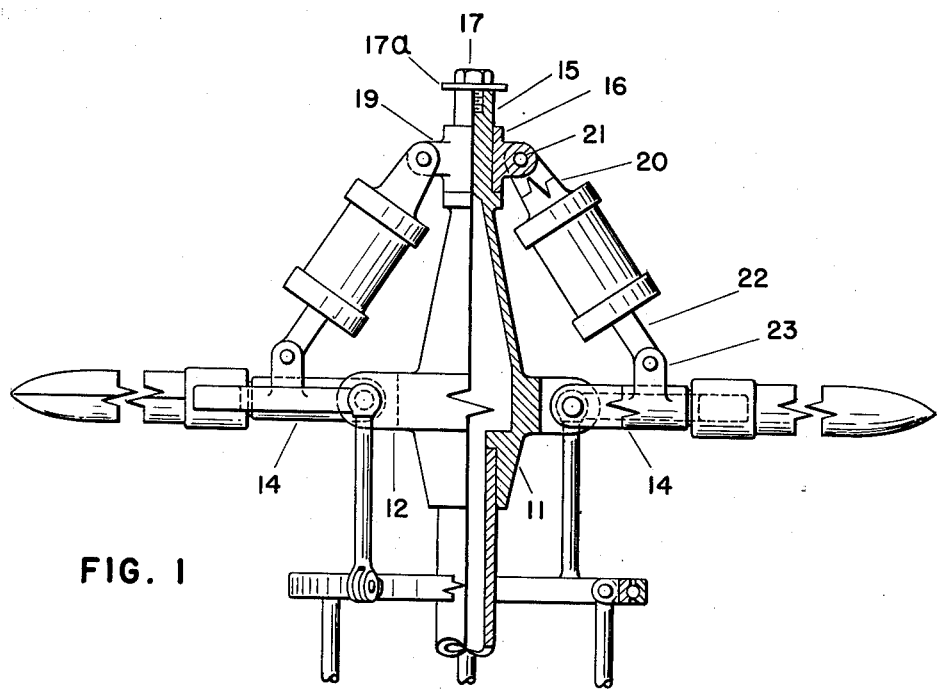

In the drawings, Figure 1 is an elevation view of a rotor hub provided with the preferred embodiment of my invention.

Figure 2:
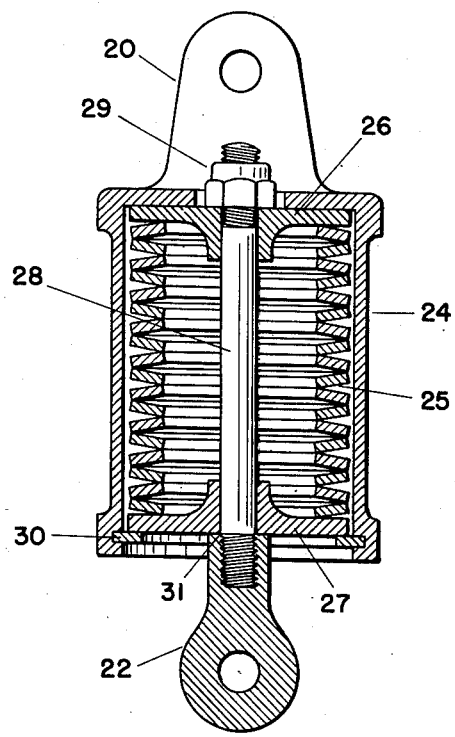

Figure 2 is a detail view of the restrainer device.

The hub is comprised of a hollow shaft 11 provided with pairs of ears 12 for mounting the blades. Although a two blade type of rotor is shown, this invention can be applied equally as well to multi-bladed rotors. Hinged to the ears 12 by pins 13 are the blades 14. Near the upper part of the rotor shaft 11 is a machined portion or shaft extension 15 on which slides a bearing member 16. The top of the shaft is drilled and tapped to receive a bolt 17. The bolt 17 is screwed down against a washer 17-a which acts to limit the upward travel of the member 16. Downward motion of this member is limited by the shoulder 18 provided on the shaft. The member 16 is pin jointed to the forked end 20 of the restrainer assembly by pins 21. The rod end 22 of the restrainer assembly is pin jointed to a projection 23 formed on the blade 14.

The restrainer assembly shown in detail in Figure 2 is comprised of a cylinder 24 partially closed at one end and provided with two projecting ears to form a fork 20. Assembled in the cylinder is a double acting spring made up of a series of cone shaped spring washers 25 retained between two plates 26 and 27 adapted to slide on a shaft 28 extending through the cylinder. The upper end of the shaft 28 is threaded and has a stop nut 29 screwed thereon. The lower end of the spring acts against a snap ring carried in a groove provided in the lower portion of the cylinder. A rod end 22 is screwed on the lower end of the shaft 28 and forms a shoulder 31 which abuts against the lower plate 27 to compress the spring when the blade flaps upward. No pitch change mechanism is shown as any conventional type may be used with this invention and such mechanisms are well known in the art.

In describing the operation of my invention, I will first assume a condition of flight wherein the pilot has actuated the cyclic control mechanism to cause the blade on one side of the rotor to have a greater lift than the opposite blade in order to apply a rolling moment to the craft. The increased lift of the blade applies a force through the shoulder 31 to the lower spring retainer 27. This force is transmitted through the spring to the restrainer housing and acts to move the bearing member 16 upwardly. The opposite blade however acts downwardly on the bearing member 16 because of the dissymmetry of lift caused by the cyclic pitch action. These two forces acting in opposite directions on the rotor shaft prevent the bearing member 16 from sliding on its shaft and resolve into a rolling couple about the center of gravity of the craft. The spring washers 25 are so loaded that normal control forces do not compress them. However, if a very high lift force should be applied to one of the blades, the spring will compress and allow the blade to flap upwardly and relieve the load so that undue bending forces will not be applied to the blade.

If both blades are suddenly loaded by a gust or by a collective increase of pitch, the resulting upward force applied through the restrainers will be substantially equal and the bearing member 16 will move upwardly on the shaft to permit proper coning of the rotor.

While the foregoing is a description of the preferred embodiment of my invention, it is to be understood that various other forms and arrangements could be made without departing from the scope and spirit of my invention as disclosed herein and claimed in the following claims.

I claim:

1. A rotor comprised of a rotor shaft, blades hinged to the rotor shaft in such a manner that blades are free to flap under the influence of aerodynamic forces, a shaft extension carried by said rotor, the axis of said shaft being coincident with the axis of the rotor shaft extension, a member mounted on said shaft extension for free reciprocation thereon, resilient blade restraining means connected to said sliding member and said blades, said sliding member allowing the blades to cone when acted on by equal forces, said sliding means cooperating with said restraining means to prevent the blades from flapping individually unless the forces are high enough to overcome the resiliency of the restraining means.

2. An aircraft rotor comprising a vertical shaft, a plurality of blades hinged to said shaft to permit said blades to flap when acted on by aerodynamic forces, blade pitch changing means associated with said rotor to vary the pitch of the blades for control purposes, a sliding member fitted to the vertical shaft for free reciprocation thereon, said sliding member being connected to each of the blades by a connecting link, said connecting link being comprised of a first member connected to the sliding member and a second member connected to the blade, a spring interposed between said connecting members to resist movement of one member relative to the other, said links and said sliding member constituting means to allow the blades to cone freely when all of said blades are acted upon by aerodynamic forces of substantially equal magnitude and said connecting links and spring members acting to resist individual flapping of the blades when the blades are acted upon by aerodynamic forces of unequal magnitude.

3. In an aircraft rotor comprising a rotor shaft, a plurality of articulated blades connected thereto, cyclic control mechanism associated with said blades, means for increasing control action of said rotor comprising in combination a freely slidable member carried by said rotor shaft, flapping restrainers connected to each of said blades and said member, said sliding member movable axially of said rotor shaft to permit said blades to cone freely when all of the blades are acted on by forces of substantially equal magnitude, said flapping restrainers and said sliding member cooperating to resist individual flapping of said blades when the pitch of said blades is changed cyclically for control purposes.

ELLIOT DALAND.

REFERENCES CITED

The following references are of record in the file of this patent:

UNITED STATES PATENTS

| Number | Name | Date |
| --- | --- | --- |
| 1,905,776 | Wilford | Apr. 25, 1933 |
| 1,940,108 | Sweet | Dec. 19, 1933 |
| 2,192,492 | Bennett | Mar. 5, 1940 |
| 2,318,260 | Sikorsky | May 4, 1943 |
| 2,397,154 | Platt | Mar. 26, 1946 |
| 2,429,646 | Pullin | Oct. 28, 1947 |

FOREIGN PATENTS

| Number | Country | Date |
| --- | --- | --- |
| 726,828 | France | June 3, 1932 |
| 293,932 | Great Britain | July 19, 1928 |